May 12, 1953 E. HARVENGT 2,638,214
JIGGING APPARATUS
Filed Feb. 23, 1949 6 Sheets-Sheet 4
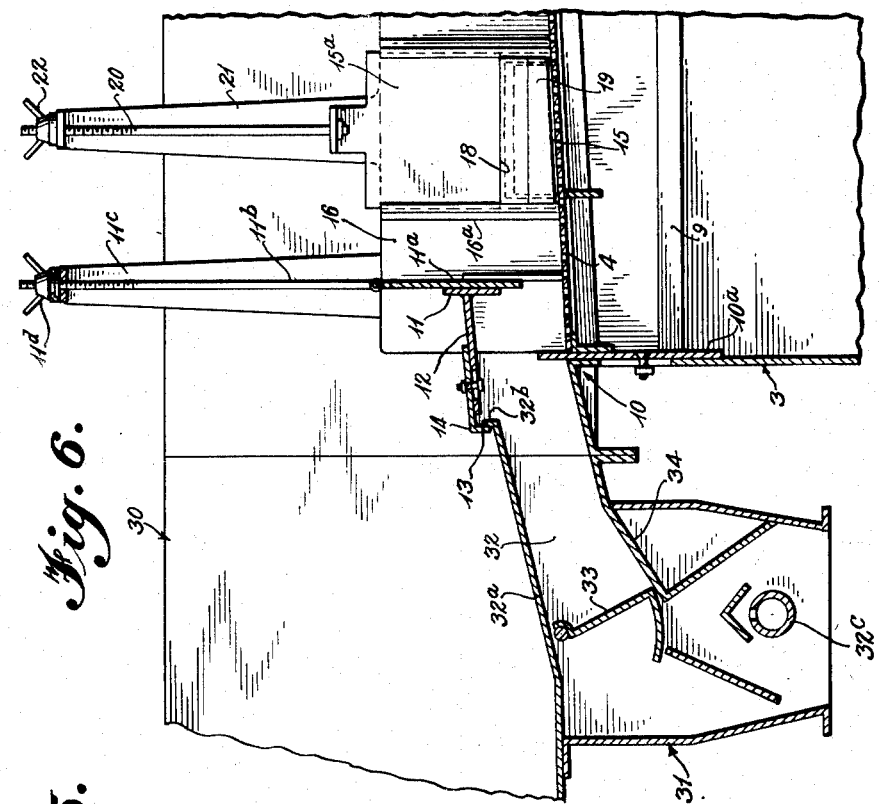
INVENTOR
*Edmond Harvengt*
BY
ATTORNEY May 12, 1953   E. HARVENGT   2,638,214
JIGGING APPARATUS
Filed Feb. 23, 1949   6 Sheets-Sheet 5

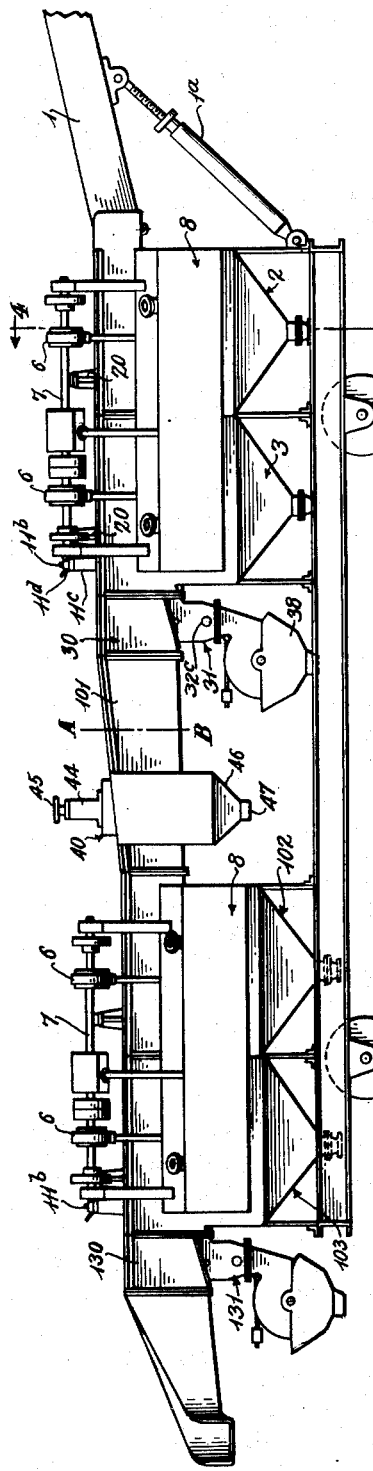

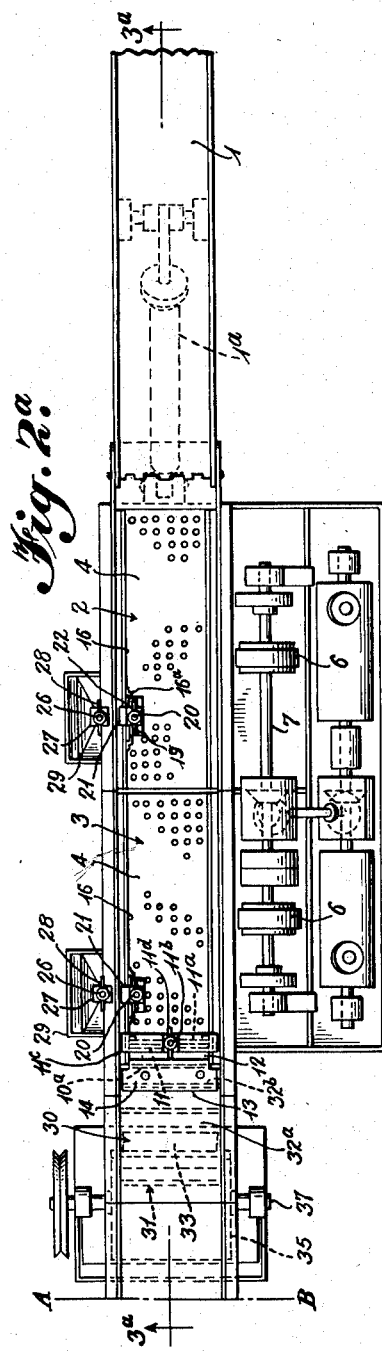

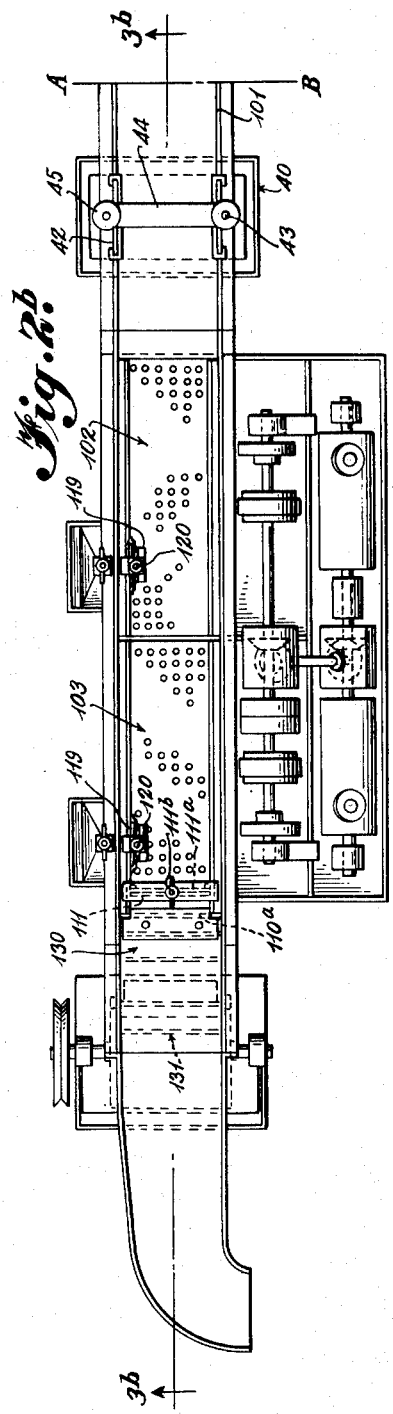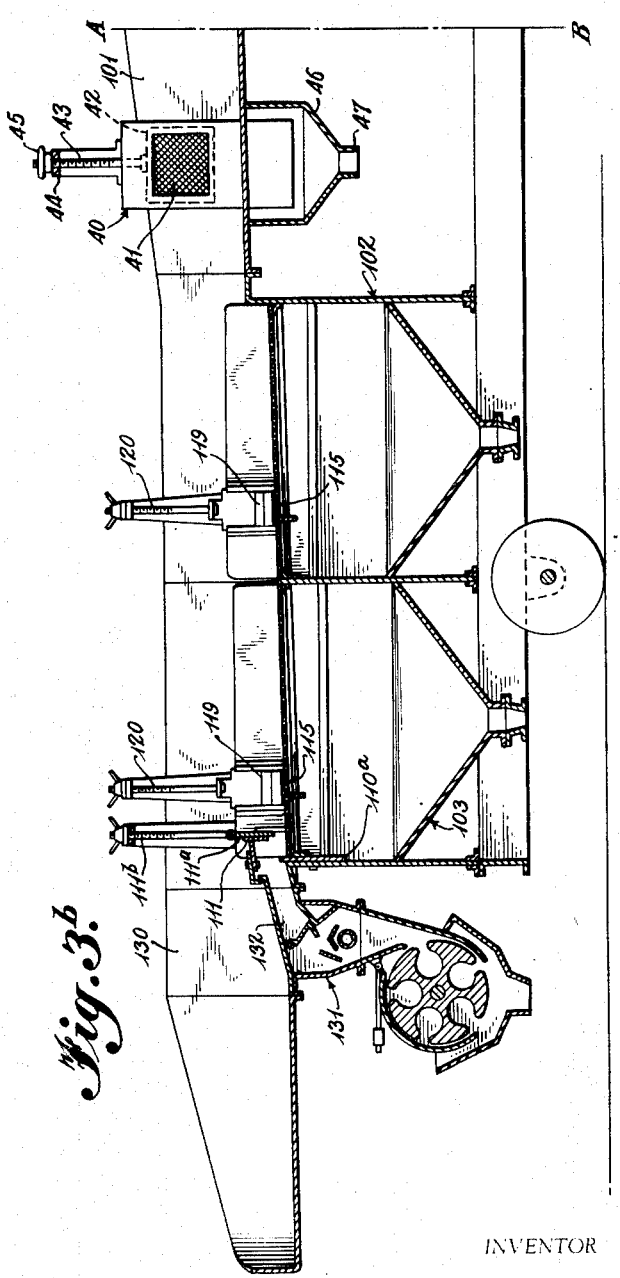

INVENTOR
*Edmond Harvengt*

BY
ATTORNEY

May 12, 1953
E. HARVENGT
2,638,214
JIGGING APPARATUS
Filed Feb. 23, 1949
6 Sheets-Sheet 6
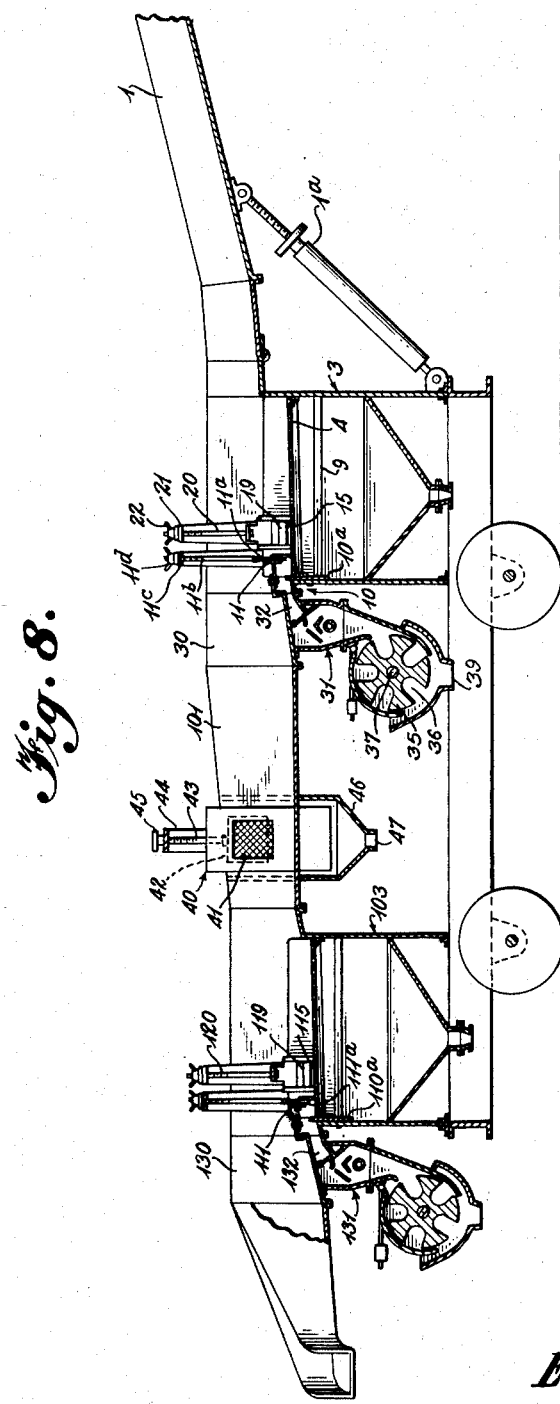
INVENTOR
*Edmond Harvengt*

Patented May 12, 1953

2,638,214

UNITED STATES PATENT OFFICE 2,638,214

JIGGING APPARATUS

Edmond Harvengt, Moustier-sur-Sambre, Belgium, assignor to Link-Belt Company, Chicago, Ill., a corporation of Illinois Application February 23, 1949, Serial No. 77,905
In Belgium March 2, 1948

11 Claims. (Cl. 209—18)

The invention relates to the treatments of materials containing particles of different densities and sizes, such as ores, coals and similar materials, and it has for its object improvements in the means for treating such materials.

In connection with the concentration of ores it is well known that in accordance with the nature, the composition, the greater or lesser degree of fineness of the particles as well as the phase of the treatment, the proper recovery of the values requires the use of different apparatus, adapted to the particular conditions to be fulfilled.

Such a situation raises numerous problems, so much the more difficult to be solved that the mine works are frequently located within regions or districts deprived, inter alia, from transportation means, while the value of the beds is mostly insufficient to enable important plants to be erected. Moreover, the teaching of the practice is that equipments which are suitable in other respects, are deprived of the necessary suppleness to answer variations which may be sometimes large and are often transient only, in the quantities and richness in valuable products of the feed in the materials to be treated.

Owing to these various reasons, the working of certain beds is not actually possible, while the working of other beds is effected only with appreciable, occasional or permanent, losses in valuable products.

The object of the invention is, inter alia, to remedy these drawbacks.

To this end, the invention consists in providing and combining into a group certain apparatus, and moreover in arranging same in such a way that by means of a group of apparatus, or of several such groups, an extended range of different treatments may be effected while answering widely variable conditions of feed in the materials to be treated.

According to one feature of the invention, there is associated into a group, at least one section of washing or alluviation trough having a water current flowing therethrough, at least one but preferably two jigging apparatus and one catching and/or extracting apparatus working on the sieve discharge of the jiggering apparatus, while each apparatus of the group may or may not play a part in the treatment to be effected, and such a group may be followed by one or several similar groups.

According to another feature of the invention, each or certain only of the jigging apparatus of a group is or are provided with their normal members and additionally with means enabling dense or valuable products to be caught on the sieves, or the evacuation from the sieves of the dense or valuable products refused thereby.

According to another feature of the invention, certain or all of the jigging apparatus of a group may be so arranged as to provide for a washing trough section or sections, their other functions or certain of them being cancelled.

According to yet another feature of the invention, the catching and/or extracting apparatus is provided with discharge means of which certain have a normally intermittent action and others have a continuous action while the operations of such means may be rendered independent or dependent from one another.

Other features and advantages of the invention will appear from the following more detailed description with the aid of the annexed drawings showing in a more or less diagrammatical manner, and by way of example only, certain preferred embodiments. In these drawings:

Fig. 1 is a side elevational view of a plane embodying the invention,

Figs. 2a and 2b are plan views which collectively illustrate the plant of Fig. 1.

Figure 7:
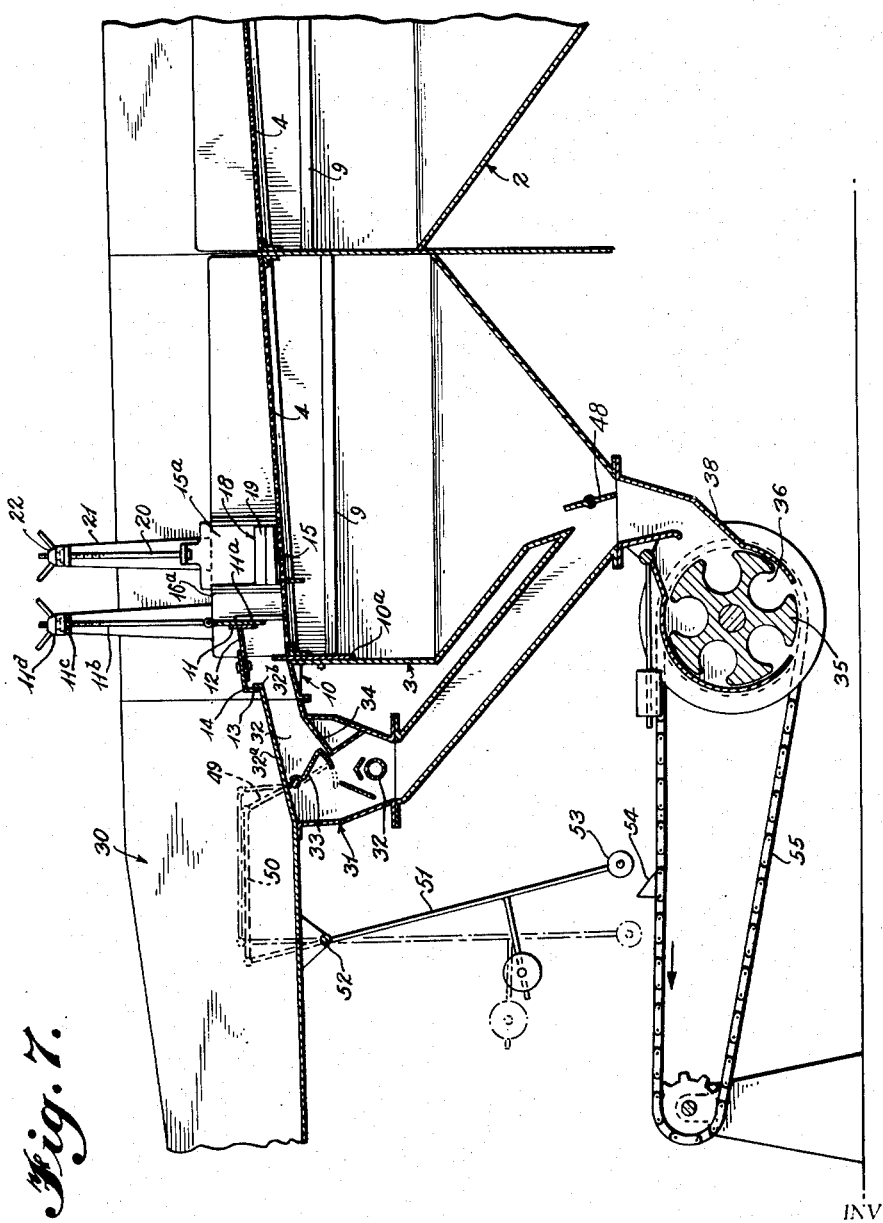

Figs. 3a and 3b are vertical sectional views which collectively illustrate the plant of Fig. 1 and which are taken on lines 3a—3a of Fig. 2a and lines 3b—3b of Fig. 2b, respectively, Fig. 4 is a vertical sectional view taken on line 4—4 of Fig. 1, Fig. 5 is a detail, transverse sectional view taken through one of the jigging units of Fig. 1, Fig. 6 is a fragmentary, longitudinal sectional view illustrating a discharge device for one of the jigging units, Fig. 7 is a simlar view to Fig. 6 but illustrates a modified form of discharge device, and Fig. 8 is a longitudinal, vertical sectional view of a modified form of plant embodying the invention.

Referring to the drawings, and first to Figs. 1 to 6, 1 designates a washing trough having a water current flowing therethrough and called alluviation trough, the slope of which may be adjusted by any suitable means, as for example by means of the screw device 1a. The references 2 and 3 designate jigging apparatus provided with sieves 4 and liquid impulses, which impulses may be generated by any suitable means as for example a reciprocating piston 5 actuated through any suitable mechanism, for example an eccentric 6 mounted on a rotating shaft 7 actuated through a prime mover which has not been illustrated.

With advantage, means are provided to compensate for the suction which may be set up by the nonworking or return stroke of the piston 5, such means being operated or not according to the requirements of the treatment to be effected.

To compensate for the suction, various kinds of arrangements may be associated with a jigging apparatus of the kind described, and by way of example only the suction compensating means have been diagrammatically illustrated at 8 as formed by means of a rotating obturating device.

The seives 4 are arranged so as to be easily replaced by other sieves of different mesh size, and to this end they are made in the form of trays fitting into the tank of the jigging apparatus, to rest on supports 9 on the walls of the tank, see Figs. 4, 5 and 6.

In one of the long sides of the tray there is formed at least one opening 15 cut out of the upstanding wall 16 thereof, and to this opening corresponds an opening 17 provided in the adjacent wall of the tank.

Both openings are provided with means for controlling the flow of the materials therethrough, such means being conveniently arranged as follows.

Within guides 16a associated with the wall 16 is adapted to slide a plate 15a considerably extended on either side of the opening 15, and opposite the latter there is formed in the plate 15a a cut away portion 18 in which a hood like member 19 is secured, the lower edge of which may be lowered so as to make contact with the sieve 4.

The plate 15a is provided with a rod extension 20 having an upper screw threaded portion passing through a bracket 21 which may be mounted on the wall 16 of the tray as illustrated or as the case may be secured to the wall of the tank, and the free end of said rod is provided with a wing nut 22 or any other suitable means enabling the rod 20 and associated members to be axially moved.

In guides 23 of the tank wall is adapted to slide a plate 24 the length and width of which are at least equal to that of said opening, said plate being provided with a rod 26 having an upper screw threaded portion passing through a bracket 27 secured to the wall of the tank and provided with a wing nut 28 enabling the plate 24 to be moved in a vertical direction.

The members 19 and 24 thus form an adjustable sluice valve and a countersluice valve for controlling the lateral discharge of the materials from the sieve.

To this lateral discharge is associated a box 29 suitably arranged for collecting the discharged materials, and secured to the side wall of the tank.

This box may be provided, where necessary, with a discharge device arranged so as to be without action on the operation of the associated jig, as for example the sluice device 29a.

At a discharge end such as 10 of the jigging apparatus, the tank is provided with an adjustable weir 10a and the corresponding tray is provided with a transverse wall 11 extending for a part only of the depth of the tray, such wall being provided outside the tray with an extension 12 arranged as a part of and protruding beyond the said end.

Preferably the extension 12 terminates in a downwardly extending flange 13 which may form part of a separate piece 14 adjustable as to its position on the extension 12.

With the transverse wall 11 is associated a movable partition 11a, preferably arranged to slide within guides formed on the side walls of the tray, and provided with means enabling the position thereof to be adjusted, such as the threaded rod 11b passing through a bracket 11c secured to the walls of the tray or of the tank. A wing nut 11d cooperating with the bracket is engaged on the threaded portion of the rod 11b for raising and lowering the partition 11a, eventually into contact with the sieve of the tray. The arrangement provides for a system comprising a sluice and a countersluice while permitting the removal of the tray to be easily effected.

Beyond a jigging apparatus such as 3 there is provided an outlet section 30, and with such a section is combined a catching and/or extracting apparatus, generally indicated 31, and comprising combined discharge means normally acting in an intermittent manner and discharge means acting in a continuous manner.

The intermittent discharge means comprise, in the example shown, a chamber 32 provided towards the outlet thereof with a shutter 33 which may be suitably balanced or provided with a counterweight in such a way as to normally close the chamber 32 while the opening thereof occurs only when, under the pressure of the materials accumulating within the chamber, the shutter 33 recedes and advances a sufficient distance, towards the left in the example, to form between it and the edge of the wall 34 of the chamber 32, a passage slit for the materials, such slit closing automatically as the pressure on the shutter 33 decreases owing to the discharge of the materials having occurred and the shutter again meets and moves past the edge of the wall 34.

The chamber 32 is provided with a top wall 32a terminating in an upturned flange 32b adapted to cooperate with the flange 13 on the extension 12 of the discharge device for the tray referred to in the foregoing.

An adjustable water inlet, suitable for providing for an ascending current through the discharge slit, may be provided at 32c.

The discharge means acting in a continuous manner comprise in the illustrated example a drum 35 formed with pockets 36, and made integral with a shaft 37 rotating in a casing 38 provided with a discharge opening 39, the shaft 37 being rotated continuously through any suitable gear not illustrated.

The materials discharged from the chamber 32 are received in the pockets 36 of the rotating drum 35 and discharged through the opening 39.

Naturally, instead of the illustrated pocket evacuator any other evacuating device acting in a continuous manner could be provided.

Where the above described group of apparatus is followed by another similar group, to the outlet section 30 is connected a washing trough section such as 101, followed by one or two jigging apparatus 102 and 103 and a catching and/or extracting apparatus 131 arranged on an outlet trough section 130.

In the trough section 101 may be mounted a device adapted for discharging from the trough a portion of the treatment liquid therein, and generally indicated 40, said device comprising an opening 41 provided with a wire gauze of appropriate mesh size and with a movable shutter 42 cooperating with said opening to adjust the discharge section thereof, the said movable shutter being equipped with a threaded rod 43 extending through a bracket 44 and provided with a hand wheel 45 in accordance with a well known arrangement. With the opening 41 is associated a collecting box 46 having an adjustable discharge opening 47.

With advantage, the whole of the assembly as described may be mounted on a wheeled frame enabling it to be easily moved from one location to another.

In the modification of Fig. 7 which shows a single group of apparatus only, the trough 1 and the jigging apparatus are similar to those described previously, but in this case there is combined with the jigging apparatus 3, a catching and/or evacuating apparatus 31, the combination being secured by means of a communication 48 of adjustable cross section provided between the lower discharge from the tank 3 and the inlet of the casing 38 having the drum 35 with pockets 36 mounted therein.

Moreover, means are provided for positively operating or regulating the opening of the shutter 33 and the discharge of the materials controlled thereby.

To this end, on the pivoting axis of the shutter 33 is secured a lever 49 which is connected through a suitable gear 50 to a lever 51 equipped with a counterweight and pivoted at 52, the end 53 of the lever 51 being so arranged as to enter the path of one or more carrying members such as 54 secured to the driving member 55—chain or belt—ensuring the continuous rotation of the pocketed drum 35.

The arrangement is such that when the shutter 33 occupies its normal position, indicated in full lines, that is when the receiving chamber bounded by the shutter 33 contains no or only a small quantity of materials to be evacuated, owing to the action of the counterweight the end 53 of the lever 51 remains outside the path of the member 54 while, when the quantity of the materials having accumulated in front of the shutter is such that the said shutter recedes and carries with it the counterweight, the end 53 is struck by a member or members 54, and thus moves the shutter 33 to a position for which the lower end thereof is spaced from the edge of the plate 34 thereby enabling at least the partial emptying of the chamber 32.

When this emptying has reached such a value that the end 53 is returned to a position clear of the path of the member or members 54, the described operation is discontinued until the accumulation of the materials in chamber 32 becomes again sufficient to cause once more said chamber to be emptied.

Finally in Fig. 8 the whole assembly of Fig. 1 may again be found, but with one jigging apparatus only in each of the successive groups of apparatus.

As already indicated, the described plants enable an extended range of treatments to be effected and either, as for example in the case of ores, on raw materials, or concentrates or middling products.

The treatment in the trough results, as is known, in a rapid grading by density of the materials; it further ensures the penetration and retention into the mass of materials of the fine and very fine dense particles which under certain conditions may have a tendency to float and thus to escape the treatment.

Moreover the lighter particles are carried along rapidly and more easily eliminated, the carrying action being moreover adjustable within certain limits through adjustment of the slope of the trough section 1.

The grading in the trough here plays the part of a preliminary treatment, the separation being effected in the apparatus associated with the trough.

The proper mesh size of the movable sieves having been correctly selected the jigging apparatus enable:

(a) After a more or less extended period of operation, the removal from the sieves of the valuable particles having accumulated thereon, which removal is facilitated on the one hand by the arrangement of the sieves as movable members and on the other hand by the retaining device comprising the fixed wall 11 and the co-operating movable partition 11a, the removal of which is effected together with that of the corresponding sieve.

This method of operation may be applied, for example, in the case of ores, where the material subjected to the treatment is formed of either a raw material or tailings having a comparatively small content in valuable particles and particle sizes of 0–12 mm. or ½–12 mm. for example.

The alluviation troughs and the jigging apparatus are then used alone; the jigging apparatus are equipped with fine mesh sieves, for example ½ or 1 mm.; the sluice 11a is closed, the lateral discharges are closed and the catching and/or extracting apparatus is rendered inoperative.

The major portion of the dense particles of smaller sizes than ½ or 1 mm. is collected at the bottom discharges of the jigging apparatus of the first group (Fig. 1), while the major portion of the dense particles of larger sizes than ½ or 1 mm., that is the particles of ½–12 or 1–12 mm., is collected on the sieves.

Should the materials passing over the sluice 11a into the section 30 yet contain valuable products, the second group of apparatus will be made to operate thereon in the manner indicated in relation with the first group of apparatus, and the valuable products collected will be united with those collected at the apparatus of the first group.

Alternatively the said products may be returned to the head of the trough 1 for retreatment.

The mesh sizes of the sieves may naturally be varied in accordance with the materials to be collected; for example a mesh size of 1 mm. for the first sieve and of 2 mm. for the second sieve may be adopted in one or both groups.

The plant would be equipped in this manner when, for example, the material to be treated is a raw ore containing a small quantity of valuable particles of small sizes, for example ranging between 0 and 2 mm. and when the product to be obtained is not to be concentrated to a considerable extent.

The provisions taken are then the same as those already indicated, that is the sluice 11a is closed, the lateral discharges are closed and the catching and/or extracting apparatus is made inoperative.

The major portion of valuable fine particles, the sizes of which are less than 1 mm., is collected at the bottom discharge of the first jigging apparatus and the major portion of the particles greater than 1 mm. is collected on the sieve of said apparatus, while the remainder or most of the remainder of the particles smaller than 2 mm. is collected at the bottom discharge of the second jigging apparatus of the group, the few remaining particles of a size greater than 2 mm. being collected on the sieve of this apparatus.

As in the preceding example, the jigging apparatus of the second group may be rendered operative where necessary or desirable.

(b) To collect through the catching and/or extracting apparatus 31, at the end of the sieves and as a matter retained thereon, the valuable particles of certain sizes—the movable partition 11a being raised in this case at a suitable height to cooperate with the duly adjusted weir 10a of the tank—while valuable particles of other sizes are collected at the bottom discharges of the jigging apparatus.

For example, there is treated an important tonnage of raw ore or ore concentrates showing an important content in valuable products. The sizes of these products are for example 0–12 mm. or ½–12 mm.

The mesh sizes of the sieves are to be made adequate and all of them will be, for example, of ½ and/or 1 mm., or evenly 1 mm. for the first jigging apparatus and 2 mm. for the second jigging apparatus of a group.

At the bottom discharges of the jigging apparatus there is collected the major portion of the valuable fine particles of 0–½, or 0–1 mm., or 0–2 mm. in sizes in accordance with the mesh sizes of the sieves, and the valuable products retained by the sieves will be collected at the catching and/or extracting device or devices.

One or both groups of apparatus—washing trough, jigging apparatus, catching and/or extracting apparatus—may be used, and if desired the products collected in the second group may be retreated by returning same to the head of the trough 1.

It is to be observed that the operating conditions as just described, enable substantial changes in the feed to be accommodated, as the products or materials having escaped to the treatment in the first group are automatically subjected thereto in the second group.

It is to be observed that in case the quantity of fine dense particles is small or when the grading in the jigging apparatus occurs rapidly owing to the nature of the constituents, in each of the groups one single jigging apparatus may be used or even provided as shown in the alternative arrangement of Fig. 8.

(c) The treatment outlined under (a) or under (b) may be completed by a continuous or temporary lateral discharge into the boxes 29 effected by means of the sluice and countersluice devices 19—24.

In the application described under (a) it is assumed that the treated product contains a small percentage of valuable particles only.

However where the feed in product to be treated is liable to substantial changes, the full capacity of the sieves of the jigging apparatus may be reached and even exceeded, with consequent losses. Should such changes occur or when they are simply to be expected, one or several lateral boxes are made to operate, through which a portion of the dense particles on the sieve or sieves may be removed either temporarily or in a continuous manner, thereby avoiding the saturation degree of the sieves to be reached or exceeded.

In the application described under (b), the removal through the lateral boxes may be used in order:

(1) To secure samples;

(2) To supplement the sieve capacity as indicated above;

(3) To secure the removal of a predetermined category or categories of products.

Returning to the product considered under (b), the 0–½ or 0–1 mm. and 1–2 mm. particles are evacuated through the bottom discharges of the jigging apparatus; the coarser dense products are collected at the catching and/or extracting apparatus, and an intermediate product, as for example the 1–5 mm. or 2–5 mm. particles, is collected in the lateral boxes by a suitable adjustment of the inlet sluices and countersluices of these boxes.

(d) Valuable particles may be collected at the bottom discharges of the jigging apparatus only, the treatment being effected on a filtering bed, which bed may be partitioned in order to avoid its being carried away.

Such a treatment on a filtering bed is applied for example when the treated material contains only a small quantity of fine valuable particles, while a largely enriched concentrate is desired.

The sieves of the jigging apparatus are provided with filtering beds, the mesh sizes used for the sieves being for example 1 mm. in the first apparatus of the first group or in each group and 2 mm. for the second apparatus of the first or each group of apparatus.

The sluice 11a is closed, the lateral boxes are closed and the catching and/or extracting apparatus is rendered inoperative.

All the valuable particles are then collected at the bottom discharges of the jigging apparatus.

(e) Instead of being used as jigging means, one or both jigging apparatus of one or both groups may serve as an extension or extensions for the washing trough, simply by arranging a solid wall as a covering on the considered sieve or sieves.

Such an arrangement is to be used in cases where an important tonnage is to be treated and where the separation by alluviation of the constituents is easily effected. It is also to be used where an extension of the treatment by alluviation may be of interest, or even where the water is to be used with management.

One example of such an application is, amongst others, the treatment of coals, the grading of which may be easily effected by alluviation.

In such a case, the valuable particles are collected at the discharge end of the trough, the shales being eliminated at the catching and/or extracting apparatus with, where necessary or desirable, partial discharge thereof through the lateral boxes.

Another application will be that of the retreatment of tailings while using, for example, the arrangement shown in Fig. 8, the quantity of the products to be recovered being then generally very small as compared with the tonnage to be treated.

While the alluviation has caused the fine particles to enter the body of the mass of materials, and assuming for example the treatment applied to tailings 0–12 mm., the very fine particles are collected at the bottom discharges of the jigging apparatus, and the coarser particles on the sieves of these apparatus.

The catching and/or extracting device or devices serve to evacuate the dense products at the end of the sieves, without any substantial reaction on the treatment applied to the materials owing to the intermittent movement of the shutter 33 as obtained automatically under the thrust of the materials to be evacuated, or effected under a driving action, in cooperation with the continuous action of the rotating pocketed drum. These devices may serve also for catching and evacuating the lower layers of a washing bed when the jigging apparatus are arranged and used as washing trough sections.

Naturally the pocketed drum referred to is by way of example only, and could be replaced by an equivalent device.

Naturally also, in certain cases, the intermittently operating discharge device may be rendered inoperative, for example where there is a considerable and continuous afflux of products to be evacuated in chamber 32, as for example when the treatment is applied to considerable tonnages of comparatively coarse and rich ores, as also in the treatment of coals.

Numerous other examples of application could still be given; they will easily appear to those skilled in the art.

As it appears from the foregoing description, in case the treatment effected in a first group of apparatus fails to give a sufficient recovery of the valuable particles, the residual product reaching the section 30 may be subjected to a complementary treatment, which may be the same as the original treatment or may differ therefrom, a discharge of the superabundant liquid being previously effected where necessary.

Naturally this complementary treatment need not furnish a product of the same grade as the one obtained from the first group of apparatus. It will suffice to thereby recover the last valuable particles under moderate concentration, as these products may always be returned to the head of the plant for retreatment purposes.

Moreover, by means of the second group of apparatus it is possible to avoid, at least momentarily, the losses due to any unseasonable increase in the feed of materials, as it is an easy matter to quickly remedy thereto due to the fact that independently of a retention of materials on the sieves or of an extraction thereof at the end of the sieves, a complementary lateral discharge of the valuable products may be effected almost instantaneously, while in addition it may be acted on the flow of the materials if necessary.

As already indicated, the invention is not limited to the details of the arrangement particularly described and illustrated, but to the contrary includes the modifications and the alternatives thereof.

I claim:

1. A plant for treating ores and coals in divided form, comprising a jigging section in which the material being treated is graded into superimposed layers while moving as a bed in a flowing liquid current by liquid impulses passed through the moving bed of material, a screen in the jigging section for supporting the moving bed of material, an extracting apparatus connected to the discharge end of the jigging section, an outlet trough section overlying the extracting apparatus and connected to the discharge end of the jigging section, and means for dividing into upper and lower portions the graded bed of material leaving the discharge end of the screen and directing the upper portion into the outlet trough section and the lower portion into the extracting apparatus, said extracting apparatus comprising a first chamber to receive said lower portion of the divided material bed from the screen and having an inclined bottom wall with a bottom discharge opening at one end portion, a shutter supported pivotally above said wall in said chamber and having a portion subjected to the thrust of the material accumulated in the chamber and another portion normally closing the said bottom discharge opening but movable into a position to uncover said opening and effect discharge of material from the first chamber when the shutter is actuated, said shutter being balanced in such a manner as to be moved toward its open position when subjected to the thrust of a given amount of accumulated material, a second chamber positioned beneath said discharge opening to receive the material discharged from the first chamber, and means for continuously discharging the material from the second chamber.

2. A plant as defined in claim 1 for treating ores and coals in divided form further characterized by the means for continuously discharging the material from the second chamber comprising a casing communicating with said second chamber and having a discharge opening, and a continuously movable member mounted in the casing for delivering to the discharge opening of the casing the material received in the second chamber.

3. A plant as defined in claim 1 for treating ores and coals in divided form further characterized by the jigging section including a tank in which is mounted said screen, a communicating passage between the portion of the jigging section tank located below the screen and the second chamber, and an adjustable member for controlling said communicating passage.

4. A plant as defined in claim 1 for treating ores and coals in divided form further characterized by the means for continuously discharging the material from the second chamber comprising a casing communicating with said second chamber and having a discharge opening, a member supported movably in the casing for delivering to the discharge opening of the casing the material received in the second chamber, drive means for continuously moving said delivering member, and means actuated by said drive means for positively moving the balanced shutter into its open position after the shutter has been moved a predetermined distance by the thrust of material accumulated in the second chamber.

5. A plant as defined in claim 1 for treating ores and coals in divided form further characterized by the jigging section including a tank in which is mounted said screen, a communicating passage between the portion of the jigging section tank located below the screen and the second chamber, an adjustable member for controlling said communicating passage, the means for continuously discharging the material from the second chamber comprising a casing communicating with said second chamber and having a discharge opening, a member supported movably in the casing for delivering to the discharge opening of the casing the material received in the second chamber, drive means for continuously moving said delivering member, and means actuated by said drive means for positively moving the balanced shutter into its open position after the shutter has been moved a predetermined distance by the thrust of material accumulated in the second chamber.

6. A plant for treating ores and coals in divided form, comprising a sloping washing trough section in which the material being treated is partially graded into superimposed layers while moving as a bed in a flowing liquid current, a jigging section connected to the discharge end of the washing trough section and in which the material is further graded by liquid impulses passed through the moving bed of material, a screen in the jigging section for supporting the moving bed of material, an extracting apparatus connected to the discharge end of the jigging section, an outlet trough section overlying the extracting apparatus and connected to the discharge end of the jigging section, and means for dividing into upper and lower portions the graded bed of material leaving the discharge end of the screen and directing the upper portion into the outlet trough section and the lower portion into the extracting apparatus, said extracting apparatus comprising a first chamber to receive said lower portion of the divided material bed from the screen and having an inclined bottom wall with a bottom discharge opening at one end portion, a shutter supported pivotally above said wall in said chamber and having a portion subjected to the thrust of the material accumulated in the chamber and another portion normally closing the said bottom discharge opening but movable into a position to uncover said opening and effect discharge of material from the first chamber when the shutter is actuated, said shutter being balanced in such a manner as to be moved toward its open position when subjected to the thrust of a given amount of accumulated material, a second chamber positioned beneath said discharge opening to receive the material discharged from the first chamber, and means for continuously discharging the material from the second chamber.

7. A plant for treating ores and coals in divided form, comprising a jigging section in which the material being treated is graded into superimposed layers while moving as a bed in a flowing liquid current by liquid impulses passed through the moving bed of material, said jigging section including a tank having a discharge opening, an adjustable weir for controlling the discharge of material through said tank opening, and a screen in the jigging section for supporting the moving bed of material; an extracting apparatus connected to the discharge end of the jigging section, an outlet trough section overlying the extracting apparatus and connected to the discharge end of the jigging section, and means for dividing into upper and lower portions the graded bed of material leaving the discharge end of the screen and directing the upper portion into the outlet trough section and the lower portion into the extracting apparatus, said extracting apparatus comprising a first chamber to receive said lower portion of the divided material bed from the screen and having an inclined bottom wall with a bottom discharge opening at one end portion, a shutter supported pivotally above said wall in said chamber and having a portion subjected to the thrust of the material accumulated in the chamber and another portion normally closing the said bottom discharge opening but movable into a position to uncover said opening and effect discharge of material from the first chamber when the shutter is actuated, said shutter being balanced in such a manner as to be moved toward its open position when subjected to the thrust of a given amount of accumulated material, a second chamber positioned beneath said discharge opening to receive the material discharged from the first chamber, and means for continuously discharging the material from the second chamber.

8. A plant for treating ores and coals in divided form, comprising a jigging section in which the material being treated is graded into superimposed layers while moving as a bed in a flowing liquid current by liquid impulses passed through the moving bed of material, said jigging section including a tank having a discharge opening, a sieve tray positioned in the tank, an adjustable weir in the discharge opening of the tank controlling the discharge of material through said opening, an adjustable partition attached to the sieve tray controlling the discharge of material from said tray to the discharge opening of said tank, and means attached to the sieve tray adjacent the discharge opening of said tank for dividing into upper and lower portions the graded bed of material leaving the discharge end of the sieve tray; extracting apparatus connected to the discharge opening of the jigging tank to receive the lower portion of the divided bed of material, and an outlet trough section overlying the extracting apparatus and connected to the discharge opening of the jigging tank to receive the upper portion of the divided bed of material, said sieve tray, material bed dividing means and adjustable partition being removable from said tank as a unit.

9. A plant for treating ores and coals in divided form, comprising a sloping washing trough section in which the material being treated is partially graded into superimposed layers while moving as a bed in a flowing liquid current, a jigging section connected to the discharge end of the washing trough section for further grading of the material by liquid impulses passed through the moving bed of material, said jigging section including a tank having a discharge opening opposite its connection with the washing trough section, a sieve tray positioned in the tank, an adjustable weir in the discharge opening of the tank controlling the discharge of material through said opening, an adjustable partition attached to the sieve tray controlling the discharge of material from said tray to the discharge opening of said tank, and means attached to the sieve tray adjacent the discharge opening of said tank for dividing into upper and lower portions the graded bed of material leaving the discharge end of the sieve tray; extracting apparatus connected to the discharge opening of the jigging tank to receive the lower portion of the divided bed of material, an outlet trough section overlying the extracting apparatus and connected to the discharge opening of the jigging tank to receive the upper portion of the divided bed of material, and means for controllably discharging material received by the extracting apparatus, said sieve tray, material bed dividing means and adjustable partition being removable from said tank as a unit.

10. A plant for treating ores and coals in divided form, comprising a jigging section in which the material being treated is graded into superimposed layers while moving as a bed in a flowing liquid current by liquid impulses passed through the moving bed of material, said jigging section including a tank having a main discharge opening and a secondary side discharge opening, a sieve tray, having end and side walls formed with discharge openings registering with the main and secondary side discharge openings of said tank, positioned in the tank, an adjustable weir in the main discharge opening of the tank controlling the discharge of material through said opening, an adjustable partition attached to the sieve tray controlling the discharge of material from said tray to the discharge opening of said tank, a pair of separately adjustable valve plates carried by the tank and by the sieve tray, respectively, for controlling the discharge of material from said tray through the secondary side discharge opening of the tank and the registering discharge opening of the sieve tray, and means attached to the sieve tray at its discharge opening which registers with the main discharge opening of said tank for dividing into upper and lower portions the graded bed of material leaving the sieve tray through such openings; extracting apparatus connected to the main discharge opening of the jigging tank to receive the lower portion of the divided bed of material, and an outlet trough section overlying the extracting apparatus and connected to the main discharge opening of the jigging tank to receive the upper portion of the divided bed of material, said sieve tray, adjustable partition, material bed dividing means and adjustable valve plates being removable from said tank as a unit.

11. A plant for treating ores and coals in divided form, comprising a sloping washing trough section in which the material being treated is partially graded into superimposed layers while moving as a bed in a flowing liquid current, a jigging section connected to the discharge end of the washing trough section for further grading of the material by liquid impulses passed through the moving bed of material, said jigging section including a tank having a main discharge opening opposite its connection with the washing trough section and a secondary side discharge opening, a sieve tray, having end and side walls formed with discharge openings registering with the main and secondary side discharge openings of said tank, positioned in the tank, an adjustable weir in the main discharge opening of the tank controlling the discharge of material through said opening, an adjustable partition attached to the sieve tray controlling the discharge of material from said tray to the discharge opening of said tank, a pair of separately adjustable valve plates carried by the tank and by the sieve tray, respectively, for controlling the discharge of material from said tray through the secondary side discharge opening of the tank and the registering discharge opening of the sieve tray, and means attached to the sieve tray at its discharge opening which registers with the main discharge opening of said tank for dividing into upper and lower portions the graded bed of material leaving the sieve tray through such openings; extracting apparatus connected to the main discharge opening of the jigging tank to receive the lower portion of the divided bed of material, an outlet trough section overlying the extracting apparatus and connected to the main discharge opening of the jigging tank to receive the upper portion of the divided bed of material, means for controllably discharging material received by the extracting apparatus, and means for further grading the material received by the outlet trough section, said sieve tray, adjustable partition, material bed dividing means and adjustable valve plates being removable from said tank as a unit.

EDMOND HARVENGT.

References Cited in the file of this patent

UNITED STATES PATENTS

| Number | Name | Date |
|---|---|---|
| 202,995 | Collum | Apr. 30, 1878 |
| 331,071 | Loder | Nov. 24, 1885 |
| 364,265 | Lauder | June 7, 1887 |
| 481,438 | Stutz | Aug. 23, 1892 |
| 922,259 | Clark | May 18, 1909 |
| 926,031 | Stover | June 22, 1909 |
| 963,519 | Cory | July 5, 1910 |
| 996,848 | Duncan | June 20, 1911 |
| 1,146,682 | Amis | July 13, 1915 |
| 1,161,733 | Riley | Nov. 23, 1915 |
| 1,217,826 | Reap | Feb. 27, 1917 |
| 1,244,210 | Hill | Oct. 23, 1917 |
| 1,252,947 | Reap | Jan. 8, 1918 |
| 1,275,235 | Faust | Aug. 13, 1918 |
| 1,317,941 | Reap | Oct. 7, 1919 |
| 1,327,537 | Elmore | Jan. 6, 1920 |
| 1,580,752 | Miller | Apr. 13, 1926 |
| 1,634,101 | Hachita | June 28, 1927 |
| 1,723,372 | Reid | Aug. 6, 1929 |
| 1,728,196 | Blatch | Sept. 17, 1929 |
| 1,931,390 | Norton | Oct. 17, 1933 |
| 2,013,414 | Llewellyn | Sept. 3, 1935 |
| 2,086,584 | Stump | July 13, 1937 |
| 2,139,789 | Wuensch | Dec. 13, 1938 |
| 2,147,822 | Peale, Jr. | Feb. 21, 1939 |
| 2,309,275 | Remer | Jan. 26, 1943 |
| 2,311,414 | Peterson | Feb. 16, 1943 |
| 2,334,337 | Lawry et al. | Nov. 16, 1943 |
| 2,384,151 | Bird | Sept. 4, 1945 |
| 2,466,120 | Nawman | Apr. 5, 1949 |
| 2,521,587 | Lintz | Sept. 5, 1950 |

OTHER REFERENCES

Richards: Ore Dressing, vol. I, McGraw-Hill Book Company, New York, New York, 1906.

Richard and Locke: Textbook of Ore Dressing, McGraw-Hill Book Company, New York, New York, 1925.

Taggart: Handbook of Mineral Dressing, John Wiley and Sons Company, New York, 1945.